US012654592B2

(12) United States Patent
Yan et al.

(10) Patent No.: US 12,654,592 B2
(45) Date of Patent: Jun. 16, 2026

(54) BATTERY SELF-HEATING SYSTEM AND VEHICLE

(71) Applicant: BYD COMPANY LIMITED, Shenzhen (CN)

(72) Inventors: Lei Yan, Shenzhen (CN); Wen Gao, Shenzhen (CN); Junwei Zhang, Shenzhen (CN); Gan Song, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 19/062,972

(22) Filed: Feb. 25, 2025

(65) Prior Publication Data

US 2025/0196719 A1     Jun. 19, 2025

Related U.S. Application Data

(63) Continuation of application No. PCT/CN2023/090701, filed on Apr. 25, 2023.

(30) Foreign Application Priority Data

Aug. 31, 2022     (CN) ......................... 202211071491.X

(51) Int. Cl.
B60L 58/27          (2019.01)
B60K 1/02           (2006.01)
(Continued)

(52) U.S. Cl.
CPC .............. B60L 58/27 (2019.02); B60L 50/60 (2019.02); B60L 53/16 (2019.02); B60L 53/62 (2019.02);
(Continued)

(58) Field of Classification Search
CPC .......... B60L 58/18; B60L 58/27; B60L 50/60; B60L 53/16; B60L 53/62; H01M 10/615;
(Continued)

(56) References Cited

U.S. PATENT DOCUMENTS

2020/0212520 A1* 7/2020 Dan ........................ B60L 58/27
2021/0354593 A1* 11/2021 Wang ...................... B60L 58/27

FOREIGN PATENT DOCUMENTS

CN          102668229 A       9/2012
CN          212373187 U       1/2021
(Continued)

OTHER PUBLICATIONS

International Search Report and Written Opinion for Application No. PCT/CN2023/090701, mailed on Jul. 31, 2023, 8 pages.

*Primary Examiner* — Hal Kaplan
(74) *Attorney, Agent, or Firm* — Sheppard Mullin Richter & Hampton LLP

(57) ABSTRACT

A battery self-heating system includes: a power battery pack, a first heating device, a second heating device and a controller. The power battery pack includes a first battery group and a second battery group connected in series; the first heating device includes a first heating sub-device and a second heating sub-device; the second heating device includes a third heating sub-device and a fourth heating sub-device; and the controller is configured to: control the first heating device and the first battery group to be alternately charged and discharged, control the second heating device and the second battery group to be alternately charged and discharged, and control, when a first one of the first battery group and the second battery group is in a discharged state, a second one of the first battery group and the second battery group to be in a charged state.

18 Claims, 6 Drawing Sheets

(51) Int. Cl.

| | |
|---|---|
| *B60L 50/60* | (2019.01) |
| *B60L 53/16* | (2019.01) |
| *B60L 53/62* | (2019.01) |
| *B60L 58/18* | (2019.01) |
| *H01M 10/615* | (2014.01) |
| *H01M 10/625* | (2014.01) |
| *H01M 10/637* | (2014.01) |
| *H02J 7/50* | (2026.01) |
| *H05B 3/06* | (2006.01) |

(52) U.S. Cl.
CPC ........... *B60L 58/18* (2019.02); *H01M 10/615* (2015.04); *H01M 10/625* (2015.04); *H01M 10/637* (2015.04); *H05B 3/06* (2013.01); *B60K 1/02* (2013.01); *H01M 2220/20* (2013.01); *H02J 7/50* (2026.01); *H05B 2203/005* (2013.01)

(58) Field of Classification Search
CPC ............. H01M 10/625; H01M 10/637; H01M 2220/20; H05B 3/06; H05B 2203/005; H02J 7/50; B60K 1/02
USPC .................................................. 307/9.1, 10.1
See application file for complete search history.

(56) References Cited

FOREIGN PATENT DOCUMENTS

| | | | |
|---|---|---|---|
| CN | 113752875 | A | 12/2021 |
| CN | 113794007 | A | 12/2021 |
| DE | 102013107767 | A1 | 1/2015 |
| JP | 2009142069 | A | 6/2009 |

* cited by examiner

BATTERY SELF-HEATING SYSTEM AND VEHICLE

CROSS-REFERENCE TO RELATED APPLICATIONS

This application is a continuation application of International Patent Application No. PCT/CN2023/090701, filed on Apr. 25, 2023, which is based on and claims priority to and benefits of Chinese Patent Application No. 202211071491. X, filed on Aug. 31, 2022. The entire content of all of the above-referenced applications is incorporated herein by reference.

FIELD

The present disclosure relates to an electric vehicle technology, and particularly, to a battery self-heating system and a vehicle.

BACKGROUND

In response to energy conservation and emission reduction, more and more electric vehicles are coming into the public eye. When an electric vehicle is in a low-temperature environment, activity of positive and negative electrode materials of a battery and activity of an electrolyte solution in the battery are reduced due to the low temperature, and charging and discharging performance of the battery is greatly reduced. To ensure power of the electric vehicle in the low-temperature environment, the battery of the electric vehicle may be heated, to cause a temperature of a battery body of the electric vehicle to increase, so as to ensure the charging and discharging performance of the battery. In the related art, battery heating is implemented through alternate charging and discharging between a battery pack and an energy storage element. However, in a current charging and discharging process, a terminal voltage fluctuation of the battery pack is large.

SUMMARY

The present disclosure provides a battery self-heating system and a vehicle, to resolve the foregoing technical problem.

A first aspect of the present disclosure provides a battery self-heating system, applicable to a vehicle. The system includes:

a power battery pack, the power battery pack including a first battery pack and a second battery pack connected to each other;

a first heating device, the first heating device including a first heating sub-device and a second heating sub-device, a first connection end and a second connection end of the first heating sub-device being respectively connected to positive and negative electrodes of the first battery pack, a first connection end and a second connection end of the second heating sub-device being respectively connected to the positive and negative electrodes of the first battery pack, and a third connection end of the first heating sub-device being connected to a third connection end of the second heating sub-device;

a second heating device, the second heating device including a third heating sub-device and a fourth heating sub-device, a first connection end and a second connection end of the third heating sub-device being respectively connected to positive and negative electrodes of the second battery pack, a first connection end and a second connection end of the fourth heating sub-device being respectively connected to the positive and negative electrodes of the second battery pack, and a third connection end of the third heating sub-device being connected to a third connection end of the fourth heating sub-device; and a controller, connected to the first heating device and the second heating device, the controller being configured to: control the first heating device and the first battery pack to be alternately charged and discharged, control the second heating device and the second battery pack to be alternately charged and discharged, and control a first one of the first battery pack and the second battery pack to be in a charging state when a second one of the first battery pack and the second battery pack is in a discharging state.

In an embodiment, the first heating sub-device includes a first heating winding and a first switch, the second heating sub-device includes a second heating winding and a second switch, the first switch includes a first upper switch and a first lower switch connected to each other, and the second switch includes a second upper switch and a second lower switch connected to each other. The first upper switch is connected to the positive electrode of the first battery pack, the first lower switch is connected to the negative electrode of the first battery pack, a first end of the first heating winding is connected to a connection point between the first upper switch and the first lower switch, a second end of the first heating winding is connected to a first end of the second heating winding, a second end of the second heating winding is connected to a connection point between the second upper switch and the second lower switch, the second upper switch is connected to the positive electrode of the first battery pack, and the second lower switch is connected to the negative electrode of the first battery pack.

The third heating sub-device includes a third heating winding and a third switch, the fourth heating sub-device includes a fourth heating winding and a fourth switch, the third switch includes a third upper switch and a third lower switch connected to each other, and the fourth switch includes a fourth upper switch and a fourth lower switch connected to each other. The third upper switch is connected to the positive electrode of the second battery pack, the third lower switch is connected to the negative electrode of the second battery pack, a first end of the third heating winding is connected to a connection point between the third upper switch and the third lower switch, a second end of the third heating winding is connected to a first end of the fourth heating winding, a second end of the fourth heating winding is connected to a connection point between the fourth upper switch and the fourth lower switch, the fourth upper switch is connected to the positive electrode of the second battery pack, and the fourth lower switch is connected to the negative electrode of the second battery pack.

In an embodiment, the first heating winding is configured as a multiphase winding in a first drive motor of the vehicle, the first switch is a first multiphase inverter in a first drive motor controller corresponding to the first drive motor, the first upper switch represents an upper bridge arm of the first multiphase inverter, and the first lower switch represents a lower bridge arm of the first multiphase inverter.

The second heating winding is configured as a multiphase winding in a second drive motor of the vehicle, the second switch is a second multiphase inverter in a second drive motor controller corresponding to the second drive motor,

3 the second upper switch represents an upper bridge arm of the second multiphase inverter, and the second lower switch represents a lower bridge arm of the second multiphase inverter.

The third heating winding is configured as a multiphase winding in a third drive motor of the vehicle, the third switch is a third multiphase inverter in a third drive motor controller corresponding to the third drive motor, the third upper switch represents an upper bridge arm of the third multiphase inverter, and the third lower switch represents a lower bridge arm of the third multiphase inverter.

The fourth heating winding is configured as a multiphase winding in a fourth drive motor of the vehicle, the fourth switch is a fourth multiphase inverter in a fourth drive motor controller corresponding to the fourth drive motor, the fourth upper switch represents an upper bridge arm of the fourth multiphase inverter, and the fourth lower switch represents a lower bridge arm of the fourth multiphase inverter.

In an embodiment, the controller is configured to: in a first state, control the upper bridge arm of the first multiphase inverter to be turned on and control the lower bridge arm of the second multiphase inverter to be turned on, to control the first battery pack to be discharged to charge the first heating winding and the second heating winding, and control the lower bridge arm of the third multiphase inverter to be turned on and control the upper bridge arm of the fourth multiphase inverter to be turned on, to control the first heating winding and the second heating winding to charge the second battery pack.

The controller is configured to: in a second state, control the lower bridge arm of the first multiphase inverter to be turned on and control the upper bridge arm of the second multiphase inverter to be turned on, to control the first heating winding and the second heating winding to charge the first battery pack, and control the upper bridge arm of the third multiphase inverter to be turned on and control the lower bridge arm of the fourth multiphase inverter to be turned on, to control the second battery pack to be discharged to charge the first heating winding and the second heating winding.

In an embodiment, the controller is further configured to: in a same state, control a first ratio of a value of a current flowing through the first battery pack to a value of a current flowing through the second battery pack to be equal to a second ratio of a resistance value of the second battery pack to a resistance value of the first battery pack.

In an embodiment, the system further includes: a first changeover switch, a second changeover switch, a third changeover switch, and a fourth changeover switch. Both the third changeover switch and the fourth changeover switch are dual-position switches.

The first changeover switch is disposed on a connection circuit of the first heating winding and the second heating winding.

The second changeover switch is arranged on a connection circuit of the third heating winding and the fourth heating winding.

A fixed contact of the third changeover switch is connected to a connection end between the lower bridge arm of the first multiphase inverter and the lower bridge arm of the second multiphase inverter, a first moving contact of the third changeover switch is connected to a negative electrode end of the first battery pack and a positive electrode end of the second battery pack, and a second moving contact of the third changeover switch is connected to a negative electrode end of the second battery pack.

A fixed contact of the fourth changeover switch is connected to a connection end between the upper bridge arm of the third multiphase inverter and the upper bridge arm of the fourth multiphase inverter, a first moving contact of the fourth changeover switch is connected to a positive electrode end of the first battery pack, and a second moving contact of the fourth changeover switch is connected to the negative electrode end of the first battery pack and the positive electrode end of the second battery pack.

The first changeover switch, the second changeover switch, the third changeover switch, and the fourth changeover switch are connected to the controller, and the controller is configured to: control the first changeover switch and the second changeover switch to be turned on, control the fixed contact of the third changeover switch to be connected to the first moving contact of the third changeover switch, and control the fixed contact of the fourth changeover switch to be connected to the second moving contact of the fourth changeover switch, to implement self-heating of the first battery pack and the second battery pack.

In an embodiment, the controller is further configured to: control the first changeover switch and the second changeover switch to be turned off, control the fixed contact of the third changeover switch to be connected to the second moving contact of the third changeover switch, and control the fixed contact of the fourth changeover switch to be connected to the first moving contact of the fourth changeover switch, to control the first battery pack and the second battery pack to supply power to the first drive motor, the second drive motor, the third drive motor, and the fourth drive motor to drive the vehicle.

In an embodiment, the system further includes a first charging switch and a second charging switch.

The first charging switch is disposed on a connection circuit of a charging port of the vehicle and the positive electrode of the first battery pack.

The second charging switch is disposed on a connection circuit of the charging port of the vehicle and the negative electrode of the second battery pack.

The controller is further configured to: in response to that the vehicle is connected to a charging pile, control the first charging switch and the second charging switch to be turned on, to charge the power battery pack while implementing the self-heating of the first battery pack and the second battery pack.

In an embodiment, the controller is further configured to: in response to that the vehicle is connected to the charging pile, control the first charging switch and the second charging switch to be turned on, and control the third changeover switch and the fourth changeover switch to be turned off, to charge the power battery pack.

A second aspect of the present disclosure further provides a vehicle, including the battery self-heating system according to the embodiments in the foregoing first aspect.

A battery self-heating system provided in the present disclosure is applicable to a vehicle. The system includes a power battery pack, a drive device, a first heating device, a second heating device, and a controller. The first heating device and a first battery pack are alternately charged and discharged, the second heating device and a second battery pack are alternately charged and discharged, and one of the first battery pack and the second battery pack is in a charging state when the other of the first battery pack and the second battery pack is in a discharging state. In this way, a voltage fluctuation of the first battery pack and a voltage fluctuation of the second battery pack during self-heating offset each other, so that a terminal voltage fluctuation of the power battery pack is small, thereby avoiding charging failure of the vehicle.

Other features and advantages of the present disclosure are to be described in detail in subsequent implementations.

BRIEF DESCRIPTION OF THE DRAWINGS

The accompanying drawings are used for providing a further understanding of the present disclosure and constitute a part of the specification, and are used for explaining the present disclosure together with implementations below, but are not to limit the present disclosure. In the accompanying drawings.

DETAILED DESCRIPTION

The following describes the implementations of the present disclosure in detail with reference to the accompanying drawings. It should be understood that the implementations described herein are merely used for describing and explaining the present disclosure, and are not to limit the present disclosure.

It should be understood that steps recorded in method implementations in the present disclosure may be performed in different orders, and/or performed in parallel. In addition, the method implementations may include an additional step and/or omit a step that is performed and shown. The scope of the present disclosure is not limited in this aspect. The term "comprise" and its variants used herein mean open inclusion, in other words, "comprising but not limited to". The term "based on" is "at least partially based on". The term "an embodiment" represents "at least one embodiment". The term "another embodiment" represents "at least one another embodiment". The term "some embodiments" represents "at least some embodiments". Related definitions of other terms are described below.

It is to be noted that, concepts such as "first" and "second" mentioned in the present disclosure are used for distinguishing different apparatuses, modules, or units, and are not used for limiting an order or independent relationship of functions performed by these apparatuses, modules, or units. It is to be noted that, modifiers "one" and "multiple" mentioned in the present disclosure are examples instead of limitations. A person skilled in the art should understand that the modifiers should be understood as "one or more", unless the context clearly indicates otherwise.

In response to energy conservation and emission reduction, more and more electric vehicles are selected by more users. To improve driving performance of the electric vehicles, a multi-motor electric vehicle known for strong power gradually enters the public eye. The strong power requires good charging and discharging performance of a battery. However, when an electric vehicle is in a low-temperature environment, especially in a temperature below $-10°$ C., activity of positive and negative electrode materials of the battery and activity of an electrolyte solution in the battery are reduced due to the low temperature, and the charging and discharging performance of the battery is to be greatly reduced. To ensure power of the electric vehicle in the low-temperature environment, the battery of the electric vehicle may be heated, to cause a temperature of a battery body of the electric vehicle to increase, so as to ensure the charging and discharging performance of the battery.

Figure 1:
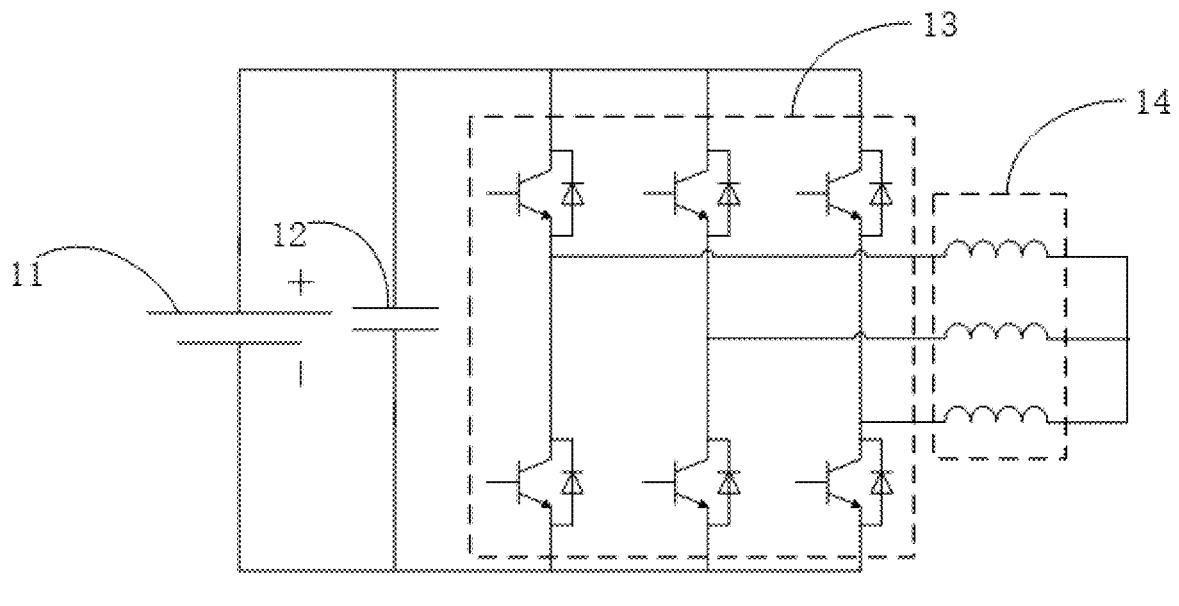
FIG. 1 is a schematic diagram of a battery self-heating circuit in the related art.

Currently, the battery may be heated in two manners: external heating and internal heating. In the external heating manner, an additional heating device is added, to heat the battery. In this heating manner, costs are high due to addition of the heating device, and heating efficiency is low because heat dissipation is fast outside and there is a distance between the external heating device and the internal battery. However, a principle of the internal heating manner is mainly to generate heat through an internal resistance of the battery by using the cyclic charging and discharging of the battery. For example, as shown in FIG. 1, a battery self-heating circuit includes a battery 11, a capacitor 12, an inverter 13, and a motor winding 14. The battery 11, the capacitor 12, and the inverter 13 are connected in parallel. Oscillating heating is performed on the battery 11 by using the inverter 13 and the motor winding 14. In addition, during the oscillating heating, the battery 11 is in an alternate charging and discharging state. Therefore, a voltage fluctuation of the battery is large. However, the fluctuation may cause damage to the battery and reduce a service life of the battery.

In addition, if a charging pile is connected for direct current charging during battery self-heating, the battery is limited by a heating principle of the battery self-heating, to be specific, when a large current flows through the battery, the internal resistance of the battery generates heat, to heat the battery. In other words, to generate a larger amount of heating, a larger self-heating current is required when the internal resistance of the battery and heating time remain unchanged. The voltage fluctuation $\Delta U$ of the battery is equal to $I \times Rcell$. In a case that a total internal resistance Rcell of the battery remains unchanged, the larger a battery current I is, the greater the voltage fluctuation $\Delta U$ of the battery is. The fluctuation may cause the charging pile to fail to track a battery voltage in real time during direct current charging, resulting in a gun jump or charging failure. In addition, due to a limitation of topology, in currents flowing through a motor winding at a same moment, there are currents flowing in the motor winding and currents flowing out of the motor winding. In other words, a heating current can only be a current limit value of a single-phase winding. As a result, a heating power is limited.

In view of this, the present disclosure provides a battery self-heating system and a vehicle, to resolve the foregoing problem.

The technical solution of the present disclosure is described in detail embodiments below.

Figure 2:
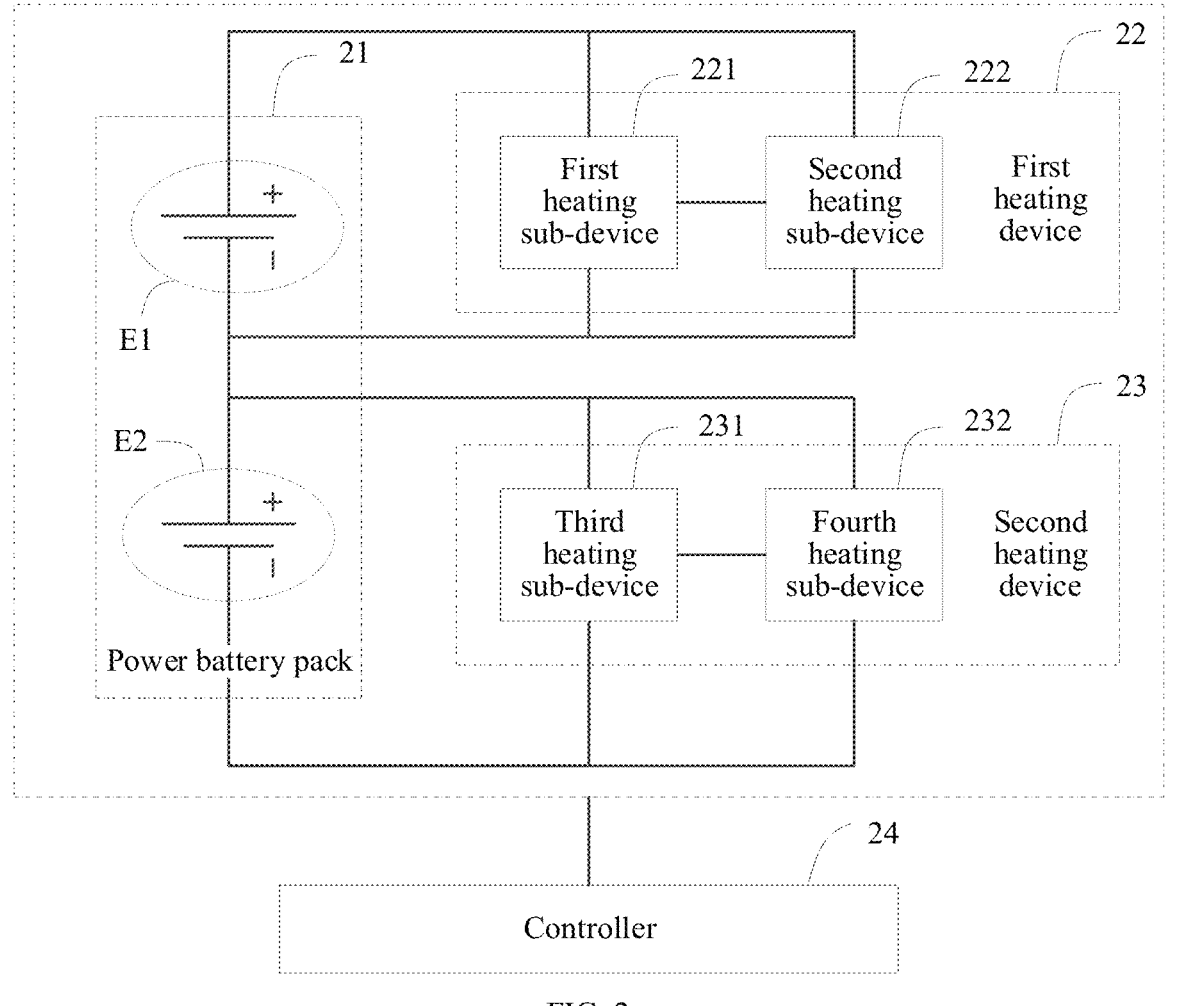
FIG. 2 is a schematic diagram of a battery self-heating system according to an embodiment of the present disclosure.

Embodiments of the present disclosure provide a battery self-heating system, applicable to a vehicle. Referring to FIG. 2, the battery self-heating system includes: a power battery pack 21, a first heating module 22, a second heating module 23, and a controller 24.

The power battery pack 21 includes a first battery pack E1 and a second battery pack E2 connected in series. The first heating module 22 (e.g., a first heating device) includes a first heating sub-module 221 (e.g., a first heating sub-device) and a second heating sub-module 222 (e.g., a second heating sub-device), a first connection end and a second connection end of the first heating sub-module 221 are respectively connected to positive and negative electrodes of the first battery pack E1, a first connection end and a second connection end of the second heating sub-module 222 are respectively connected to the positive and negative electrodes of the first battery pack E1, and a third connection end of the first heating sub-module 221 is connected to a third connection end of the second heating sub-module 222. The second heating module 23 includes a third heating sub-module 231 (e.g., a third heating sub-device) and a fourth heating sub-module 232 (e.g., a fourth heating sub-device), a first connection end and a second connection end of the third heating sub-module 231 are respectively connected to positive and negative electrodes of the second battery pack E2, a first connection end and a second connection end of the fourth heating sub-module 232 are respectively connected to the positive and negative electrodes of the second battery pack E2, and a third connection end of the third heating sub-module 231 is connected to a third connection end of the fourth heating sub-module 232. The controller 24 is connected to the first heating module 22 and the second heating module 23. The controller 24 is configured to: control the first heating module 22 and the first battery pack E1 to be alternately charged and discharged, control the second heating module 23 and the second battery pack E2 to be alternately charged and discharged, and control one of the first battery pack E1 and the second battery pack E2 to be in a charging state when the other of the first battery pack E1 and the second battery pack E2 is in a discharging state.

When the foregoing battery self-heating system is used for battery self-heating, a voltage fluctuation of the first battery pack and a voltage fluctuation of the second battery pack may offset each other, so that a terminal voltage fluctuation of the power battery pack is small, thereby avoiding charging failure of the vehicle.

To enable a person skilled in the art to better understand the battery self-heating system provided in the present disclosure, the foregoing steps are described in detail with examples below.

Figure 3:
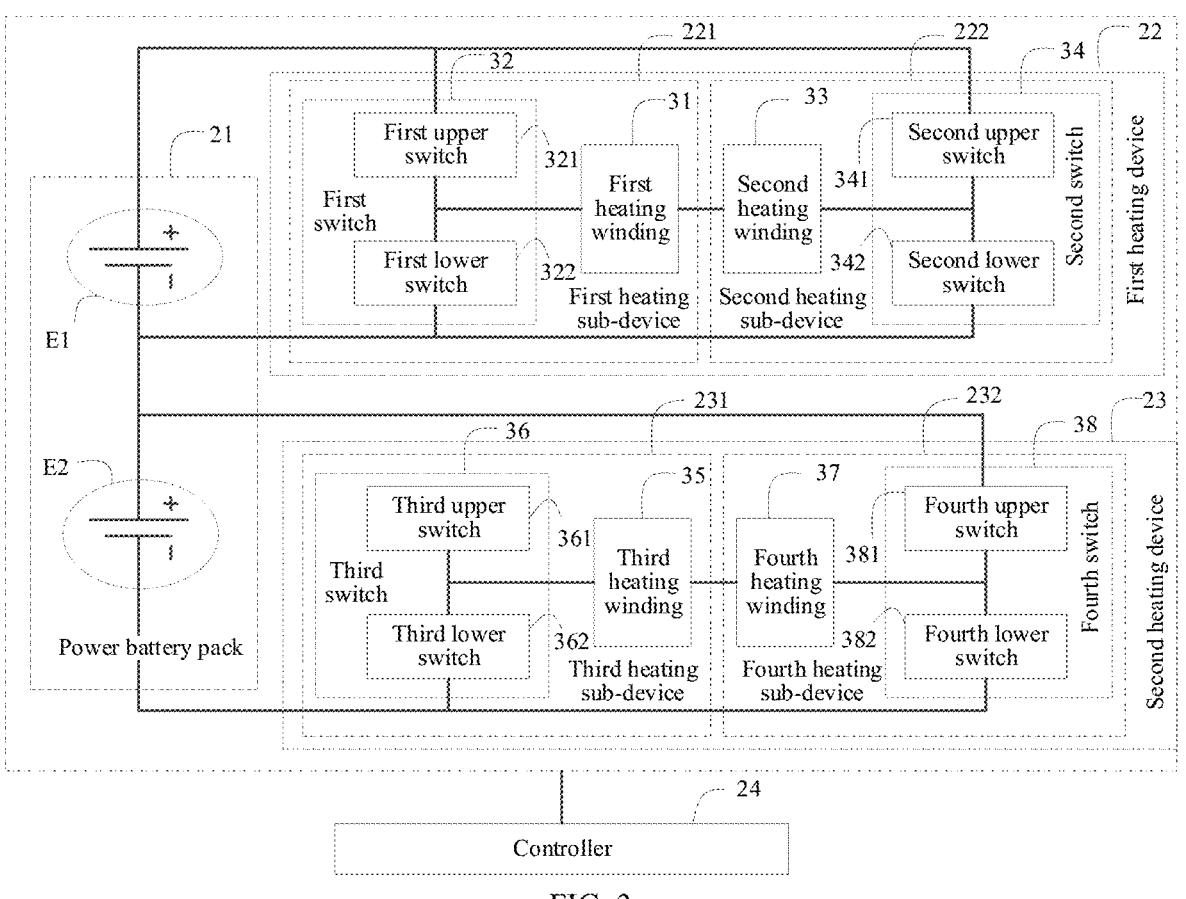
FIG. 3 is a schematic diagram of a battery self-heating system according to another embodiment of the present disclosure.

In an embodiment, referring to FIG. 3, the first heating sub-module 221 includes a first heating winding 31 and a first switch 32, the second heating sub-module 222 includes a second heating winding 33 and a second switch 34, the first switch 32 includes a first upper switch 321 and a first lower switch 322 connected in series, and the second switch 34 includes a second upper switch 341 and a second lower switch 342 connected in series. The first upper switch 321 is connected to the positive electrode of the first battery pack E1, the first lower switch 322 is connected to the negative electrode of the first battery pack E1, a first end of the first heating winding 31 is connected to a connection point between the first upper switch 321 and the first lower switch 322, a second end of the first heating winding 31 is connected to a first end of the second heating winding 33, a second end of the second heating winding 33 is connected to a connection point between the second upper switch 341 and the second lower switch 342, the second upper switch 341 is connected to the positive electrode of the first battery pack E1, and the second lower switch 342 is connected to the negative electrode of the first battery pack E1.

In addition, the third heating sub-module 231 includes a third heating winding 35 and a third switch 36, the fourth heating sub-module 232 includes a fourth heating winding 37 and a fourth switch 38, the third switch 36 includes a third upper switch 361 and a third lower switch 362 connected in series, and the fourth switch 38 includes a fourth upper switch 381 and a fourth lower switch 382 connected in series. The third upper switch 361 is connected to the positive electrode of the second battery pack E2, the third lower switch 362 is connected to the negative electrode of the second battery pack E2, a first end of the third heating winding 35 is connected to a connection point between the third upper switch 361 and the third lower switch 362, a second end of the third heating winding 35 is connected to a first end of the fourth heating winding 37, a second end of the fourth heating winding 37 is connected to a connection point between the fourth upper switch 381 and the fourth lower switch 382, the fourth upper switch 381 is connected to the positive electrode of the second battery pack E2, and the fourth lower switch 382 is connected to the negative electrode of the second battery pack E2.

Figure 4:
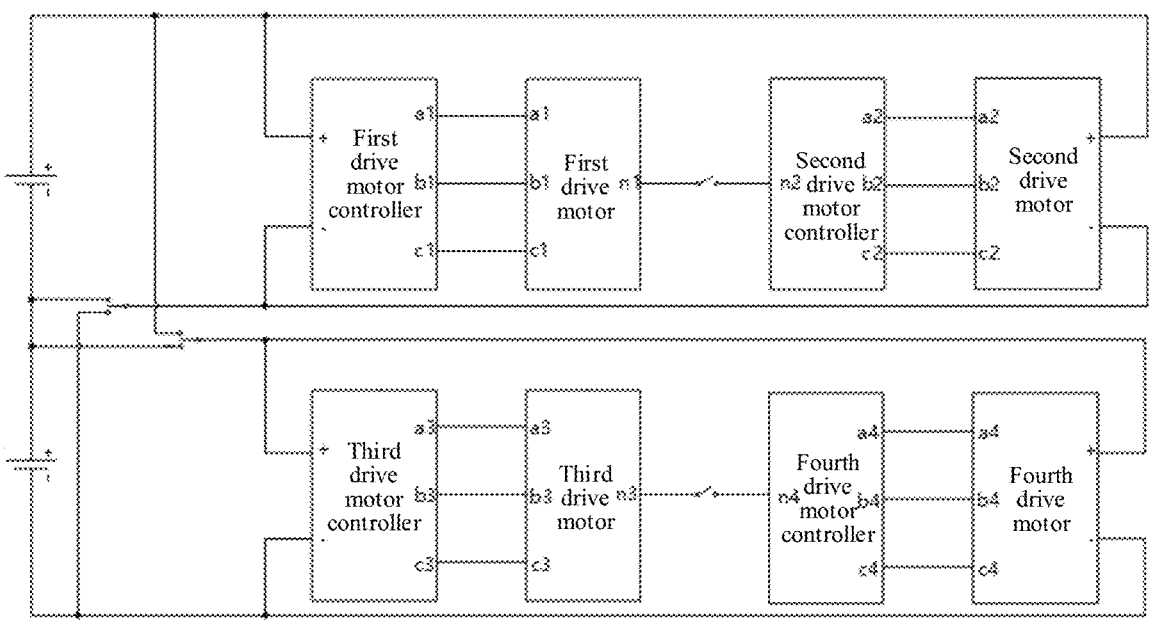
FIG. 4 is a schematic diagram of a battery self-heating system according to another embodiment of the present disclosure.

In an embodiment, for a vehicle with multiple motors, self-heating may be performed on a power battery pack by using multiple drive motor controllers and multiple drive motors in the vehicle. Referring to FIG. 4, a vehicle with multiple three-phase motors is used as an example. A power battery pack is divided into two battery packs, and four groups of drive motor controllers and drive motors are selected. A drive motor controller and a drive motor in one group are respectively used as a first switch and a first heating winding of a first heating sub-module. A drive motor controller and a drive motor in one group are respectively used as a second switch and a second heating winding of a second heating sub-module. A drive motor controller and a drive motor in one group are respectively used as a third switch and a third heating winding of a third heating sub-module. A drive motor controller and a drive motor in one group are respectively used as a fourth switch and a fourth heating winding of a fourth heating sub-module.

Figure 5:
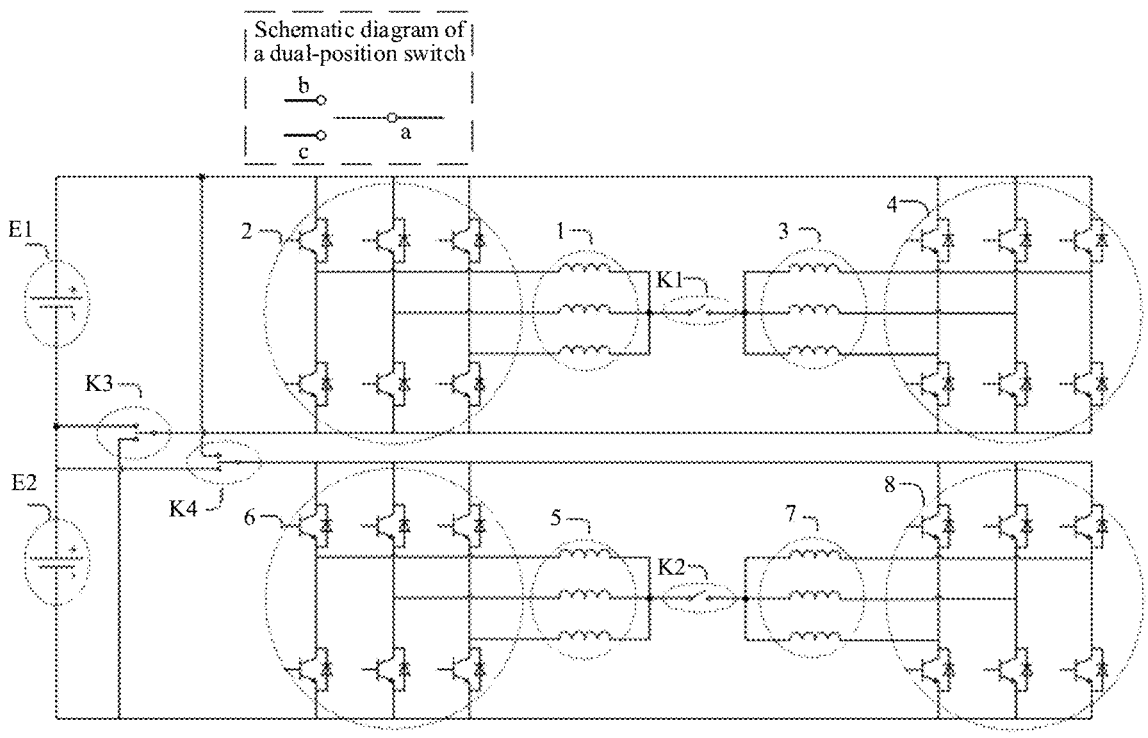
FIG. 5 is a circuit diagram of a battery self-heating system according to an embodiment of the present disclosure.

Referring to FIG. 5, the first heating winding is a multiphase winding in a first drive motor 1 of the vehicle, the first switch is a first multiphase inverter in a first drive motor controller 2 corresponding to the first drive motor 1, the first upper switch represents an upper bridge arm of the first multiphase inverter, and the first lower switch represents a lower bridge arm of the first multiphase inverter. The second heating winding is a multiphase winding in a second drive motor 3 of the vehicle, the second switch is a second multiphase inverter in a second drive motor controller 4 corresponding to the second drive motor 3, the second upper switch represents an upper bridge arm of the second multiphase inverter, and the second lower switch represents a lower bridge arm of the second multiphase inverter. The third heating winding is a multiphase winding in a third drive motor 5 of the vehicle, the third switch is a third multiphase inverter in a third drive motor controller 6 corresponding to the third drive motor 5, the third upper switch represents an upper bridge arm of the third multiphase inverter, and the third lower switch represents a lower bridge arm of the third multiphase inverter. The fourth heating winding is a multiphase winding in a fourth drive motor 7 of the vehicle, the fourth switch is a fourth multiphase inverter in a fourth drive motor controller 8 corresponding to the fourth drive motor 7, the fourth upper switch represents an upper bridge arm of the fourth multiphase inverter, and the fourth lower switch represents a lower bridge arm of the fourth multiphase inverter.

In an embodiment, the controller is configured to: in a first preset state, control the upper bridge arm of the first multiphase inverter to be turned on and control the lower bridge arm of the second multiphase inverter to be turned on, to control the first battery pack to be discharged to charge the first heating winding and the second heating winding, and control the lower bridge arm of the third multiphase inverter to be turned on and control the upper bridge arm of the fourth multiphase inverter to be turned on, to control the first heating winding and the second heating winding to charge the second battery pack.

In an embodiment, the controller is configured to: in a second preset state, control the lower bridge arm of the first multiphase inverter to be turned on and control the upper bridge arm of the second multiphase inverter to be turned on, to control the first heating winding and the second heating winding to charge the first battery pack, and control the upper bridge arm of the third multiphase inverter to be turned on and control the lower bridge arm of the fourth multiphase inverter to be turned on, to control the second battery pack to be discharged to charge the first heating winding and the second heating winding.

Figure 6:
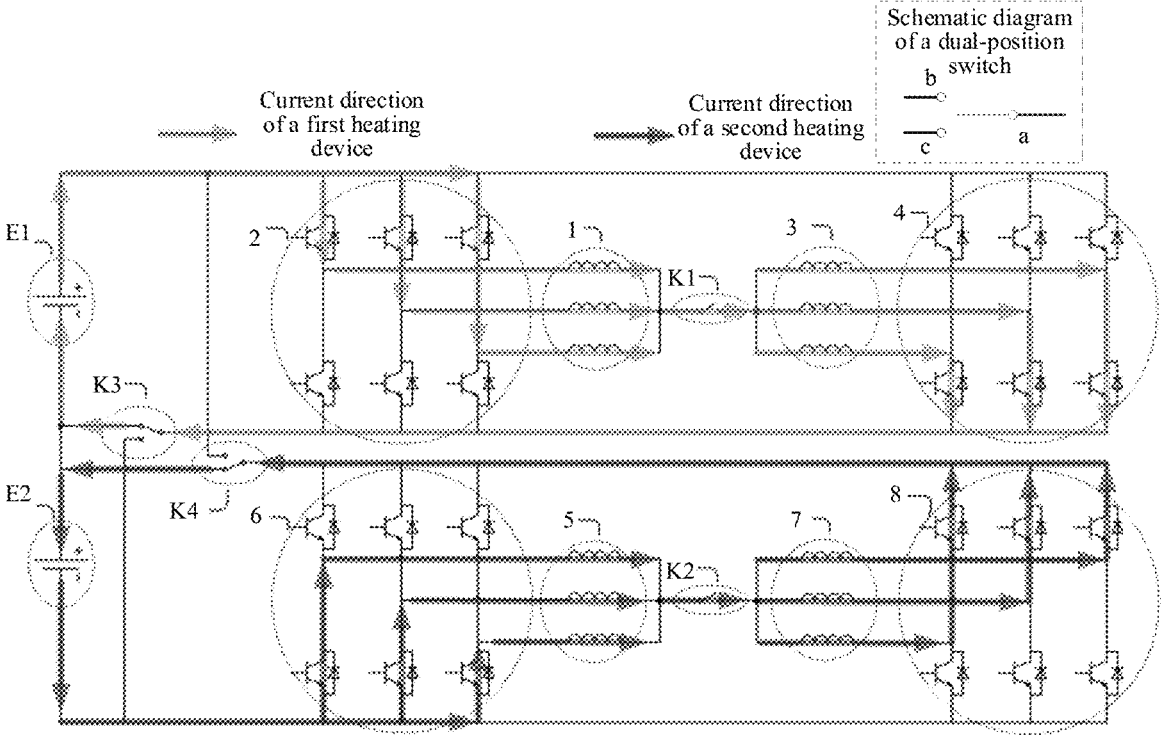
FIG. 6 is a schematic diagram of a current direction when a battery self-heating system operates according to an embodiment of the present disclosure.

For example, in the first preset state, referring to FIG. 6, the upper bridge arm of the first drive motor controller 2 is turned on, and the lower bridge arm of the first drive motor controller 2 is turned off. The upper bridge arm of the second drive motor controller 4 is turned off, and the lower bridge arm of the second drive motor controller 4 is turned on. The first battery pack E1 charges the multiphase winding in the first drive motor 1 through the upper bridge arm of the first drive motor controller 2. A charging current flows through the second drive motor 3, to charge the multiphase winding in the second drive motor 3, and the charging current finally flows back to first battery pack E1 through the lower bridge arm of the second drive motor controller 4. In this case, the first battery pack E1 is discharged, and a voltage drops. The upper bridge arm of the third drive motor controller 6 is turned off, and the lower bridge arm of the third drive motor controller 6 is turned on or turned off (according to a feature that a diode is unidirectionally turned on, the current passes through a parasitic diode of the lower bridge arm when the lower bridge arm is turned off, and the same applies below). The upper bridge arm of the fourth drive motor controller 8 is turned on or turned off, and the lower bridge arm of the fourth drive motor controller 8 is turned off. The multiphase winding in the third drive motor 5 and the multiphase winding in the fourth drive motor 7 charge, through the upper bridge arm of the fourth drive motor controller 8, the second battery pack E2 by using stored energy. In this case, the second battery pack E2 is charged, and a voltage rises.

Figure 7:
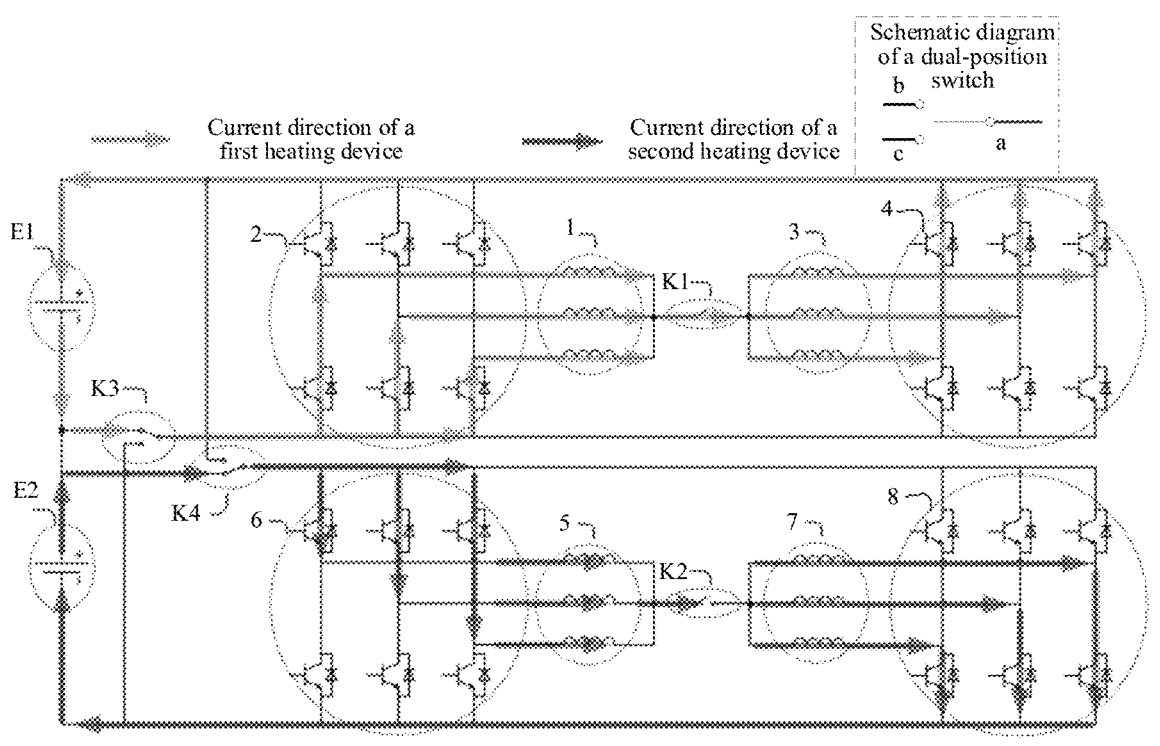
FIG. 7 is a schematic diagram of a current direction when a battery self-heating system operates according to another embodiment of the present disclosure.
Figure 8:
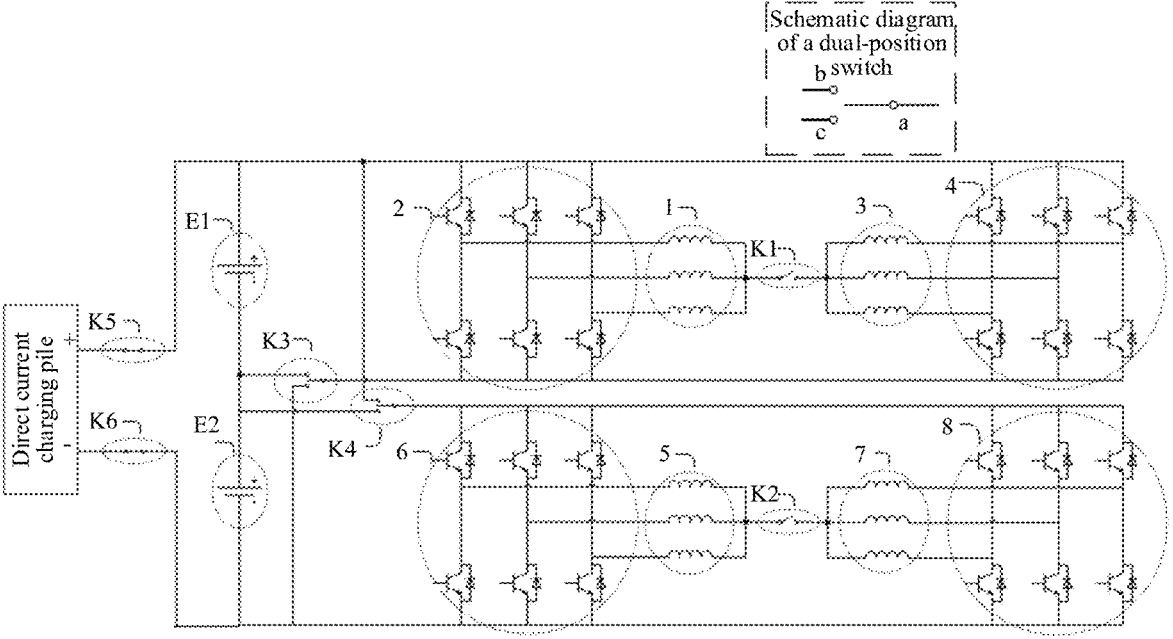
FIG. 8 is a circuit diagram of another battery self-heating system according to an embodiment of the present disclosure.

For example, in the second preset state, referring to FIG. 7, the upper bridge arm of the first drive motor controller 2 is turned off, and the lower bridge arm of the first drive motor controller 2 is turned on or turned off. The upper bridge arm of the second drive motor controller 4 is turned on or turned off, and the lower bridge arm of the second drive motor controller 4 is turned off. The multiphase winding in the first drive motor 1 and the multiphase winding in the second drive motor 3 charge, through the upper bridge arm of the second drive motor controller 4, the first battery pack E1 by using stored energy. In this case, the first battery pack E1 is charged, and a voltage rises. The upper bridge arm of the third drive motor controller 6 is turned on, and the lower bridge arm of the third drive motor controller 6 is turned off. The upper bridge arm of the fourth drive motor controller 8 is turned off, and the lower bridge arm of the fourth drive motor controller 8 is turned on. The second battery pack E2 charges the multiphase winding in the third drive motor 5 through the upper bridge arm of the third drive motor controller 6. A charging current flows through the fourth drive motor 7, to charge the multiphase winding in the fourth drive motor 7, and the charging current finally flows back to second battery pack E2 through the lower bridge arm of the fourth drive motor controller 8. In this case, the second battery pack E2 is discharged, and a voltage drops.

It is noticeable that, in the first preset state, a voltage of the first battery pack E1 continues to drop, and a drop range $\Delta U_1$ is equal to $I_1 \times Rcell_1$. A voltage of the second battery pack E2 continues to rise, and a rise range $\Delta U_2$ is equal to $I_2 \times Rcell_2$. In the second preset state, a voltage of the first battery pack E1 continues to rise, and a rise range $\Delta U_1$ is equal to $I_1 \times Rcell_1$. A voltage of the second battery pack E2 continues to drop, and a drop range $\Delta U_2$ is equal to $I_2 \times Rcell_2$. Therefore, the current $I_1$ and the resistance $Rcell_1$ of the first battery pack and the current $I_2$ and the resistance $Rcell_2$ of the second battery pack are controlled, so that a total voltage fluctuation of the power battery pack may be within a preset voltage fluctuation range, for example, −0.5 V to 0.5 V. A preset voltage fluctuation range may be determined according to a requirement, and this is not limited in the present disclosure. On a premise that $Rcell_1$ is equal to $Rcell_2$, as long as it is ensured that $I_1$ is equal to $I_2$, the total voltage fluctuation of the power battery pack may be 0. In this way, by cycling back and forth between the first preset state and the second preset state, energy is cyclically charged and discharged between the power battery pack and a motor winding, thereby implementing battery self-heating.

In an embodiment, the controller is further configured to: in a same preset state, control a ratio of a value of a current flowing through the first battery pack to a value of a current flowing through the second battery pack to be equal to a ratio of a resistance value of the second battery pack to a resistance value of the first battery pack.

For example, it may be learned from the foregoing charging and discharging process between the first battery pack and the second battery pack during battery self-heating that, the voltage fluctuation is related with a current and a resistance of the battery. The resistance value of the battery pack is determined when the battery pack is divided. Therefore, the total voltage fluctuation of the power battery pack may be kept within the preset voltage fluctuation range by adjusting the current of the battery pack. For example, if the power battery pack is divided into two battery packs with a same number of battery cores, $Rcell_1$ is equal to $Rcell_2$. If the total voltage fluctuation of the power battery pack needs to be controlled to be 0, a case in which $I_1$ is equal to $I_2$ may be controlled. For another example, the power battery pack is divided into two battery packs with different numbers of battery cores. If the total voltage fluctuation of the power battery pack needs to be controlled to be 0, a case in which $I_1/I_2$ is equal to $Rcell_2/Rcell_1$ may be controlled. In other words, in a case that the ratio of the value of the current flowing through the first battery pack to the value of the current flowing through the second battery pack is equal to the ratio of the resistance value of the second battery pack to the resistance value of the first battery pack, the total voltage fluctuation of the power battery pack is equal to 0. Correspondingly, if only the total voltage fluctuation of the power battery pack needs to be controlled to be within the preset voltage fluctuation range, the current of the battery pack into which the power battery pack is divided may be controlled based on a control relationship that the larger the resistance of the battery pack, the smaller the current. Details may be determined based on a requirement and a test, and this is not limited in the present disclosure.

In addition, the power battery pack may be divided into three battery packs, four battery packs, or the like, and one heating module is assigned to each battery pack. A number of battery packs and a number of battery cores in the battery pack are not limited in the present disclosure, as long as the total voltage fluctuation of the power battery pack is within the preset voltage fluctuation range. For example, a resistance value of each battery core in the power battery pack is equal. Assuming that numbers of battery cores included in the battery packs are respectively $N_1$, $N_2$, $N_3$, . . . , and $N_n$, self-heating currents of the battery packs should meet that $I_1/I_2/I_3/ . . . /I_n$ is equal to $N_n/ . . . /N_3/N_2/N_1$. Certainly, each battery pack may be connected in parallel with multiple heating modules, as long as a sum of currents of the heating modules is controlled to be equal to a current of the battery pack. The currents of the heating modules connected in parallel in the same battery pack may be equal or unequal, and this is not limited in the present disclosure. In addition, compared with the related art in which a heating current can only be a current limit value of a single-phase winding, in the battery self-heating system provided in the embodiments of the present disclosure, due to addition of the drive motor and the drive motor controller, a maximum heating current may be a current limit value of an N-phase winding. For example, for the three-phase drive motor in FIG. 5, the maximum heating current is a current limit value of a three-phase winding, which is three times the heating current in the related art, so that efficiency of battery self-heating is improved.

In an embodiment, a switch may be added in a circuit to control on/off of the circuit. Referring to FIG. 5, the system further includes: a first changeover switch K1, a second changeover switch K2, a third changeover switch K3, and a fourth changeover switch K4. Both the third changeover switch K3 and the fourth changeover switch K4 are dual-position switches.

The first changeover switch K1 is arranged/disposed on a connection circuit of the first heating winding (the multiphase winding in the first drive motor 1) and the second heating winding (the multiphase winding in the second drive motor 3). The second changeover switch K2 is arranged on a connection circuit of the third heating winding (the multiphase winding in the third drive motor 5) and the fourth heating winding (the multiphase winding in the fourth drive motor 7). A fixed contact a of the third changeover switch K3 is connected to a connection end between the lower bridge arm of the first multiphase inverter (in the first drive motor controller 2) and the lower bridge arm of the second multiphase inverter (in the second drive motor controller 4), a first moving contact b of the third changeover switch K3 is separately connected to a negative electrode end of the first battery pack E1 and a positive electrode end of the second battery pack E2, and a second moving contact c of the third changeover switch K3 is connected to a negative electrode end of the second battery pack E2. A fixed contact a of the fourth changeover switch K4 is connected to a connection end between the upper bridge arm of the third multiphase inverter (in the third drive motor controller 6) and the upper bridge arm of the fourth multiphase inverter (in the fourth drive motor controller 8), a first moving contact b of the fourth changeover switch K4 is connected to a positive electrode end of the first battery pack E1, and a second moving contact c of the fourth changeover switch K4 is separately connected to the negative electrode end of the first battery pack E1 and the positive electrode end of the second battery pack E2.

In an embodiment, the first changeover switch K1, the second changeover switch K2, the third changeover switch K3, and the fourth changeover switch K4 are connected to the controller, and the controller is configured to: control the first changeover switch K1 and the second changeover switch K2 to be turned on, control the fixed contact a of the third changeover switch K3 to be connected to the first moving contact b of the third changeover switch K3, and control the fixed contact a of the fourth changeover switch K4 to be connected to the second moving contact c of the fourth changeover switch K4, to implement self-heating of the first battery pack E1 and the second battery pack E2. For details, refer to FIG. 6 and FIG. 7.

In an embodiment, the controller is further configured to: control the first changeover switch K1 and the second changeover switch K2 to be turned off, control the fixed contact a of the third changeover switch K3 to be connected to the second moving contact c of the third changeover switch K3, and control the fixed contact a of the fourth changeover switch K4 to be connected to the first moving contact b of the fourth changeover switch K4, to control the first battery pack E1 and the second battery pack E2 to supply power to the first drive motor, the second drive motor, the third drive motor, and the fourth drive motor to drive the vehicle.

For example, the first changeover switch K1 and the second changeover switch K2 are controlled to be turned off, the fixed contact a of the third changeover switch K3 is controlled to be connected to the second moving contact c of the third changeover switch K3, and the fixed contact a of the fourth changeover switch K4 is controlled to be connected to the first moving contact b of the fourth changeover switch K4. In this case, the first drive motor and the first drive motor controller, the second drive motor and the second drive motor controller, the third drive motor and the third drive motor controller, and the fourth drive motor and the fourth drive motor controller each form drive modules and are separately connected to the power battery pack in parallel. For an operating process of the drive motor and the drive motor controller in a drive mode, refer to the related art, and details are not described in the present disclosure again.

In an embodiment, the system further includes a first charging switch K5 and a second charging switch K6. The first charging switch K5 is arranged on a connection circuit of a charging port of the vehicle and the positive electrode of the first battery pack E1, and the second charging switch K6 is arranged on a connection circuit of the charging port of the vehicle and the negative electrode of the second battery pack E2. The controller is further configured to: when the vehicle is connected to a charging pile, control the first charging switch K5 and the second charging switch K6 to be turned on, to charge the power battery pack while implementing the self-heating of the first battery pack E1 and the second battery pack E2.

Figure 9:
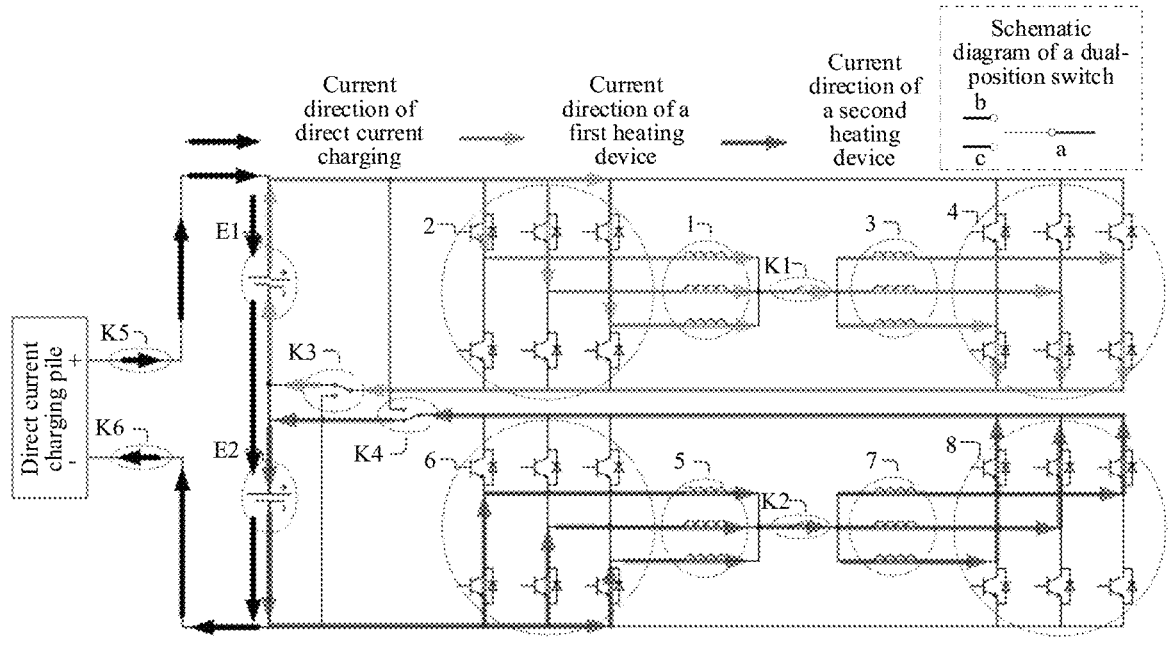
FIG. 9 is a schematic diagram of a current direction when a battery self-heating system operates according to another embodiment of the present disclosure.

For example, when the vehicle needs direct current charging and performs battery self-heating, the first charging switch K5, the second charging switch K6, the first change-over switch K1, and the second changeover switch K2 are controlled to be turned on, the fixed contact a of the third changeover switch K3 is controlled to be connected to the first moving contact b of the third changeover switch K3, and the fixed contact a of the fourth changeover switch K4 is controlled to be connected to the second moving contact c of the fourth changeover switch K4. FIG. 9 shows bridge arm statuses and current directions of the first heating module and the second heating module in the first preset state, and the current direction of direct current charging. For bridge arm statuses and current directions of the first heating module and the second heating module in the second preset state, refer to FIG. 7, and details are not described in the present disclosure again. In this way, the power battery pack is charged while the self-heating of the first battery pack E1 and the second battery pack E2 is implemented. A voltage fluctuation of the first battery pack and a voltage fluctuation of the second battery pack offset each other, so that a terminal voltage fluctuation of the power battery pack is small, thereby avoiding charging failure of the vehicle.

In an embodiment, the controller is further configured to: when the vehicle is connected to the charging pile, control the first charging switch and the second charging switch to be turned on, and control the third changeover switch and the fourth changeover switch to be turned off, to separately charge the power battery pack.

Figure 10:
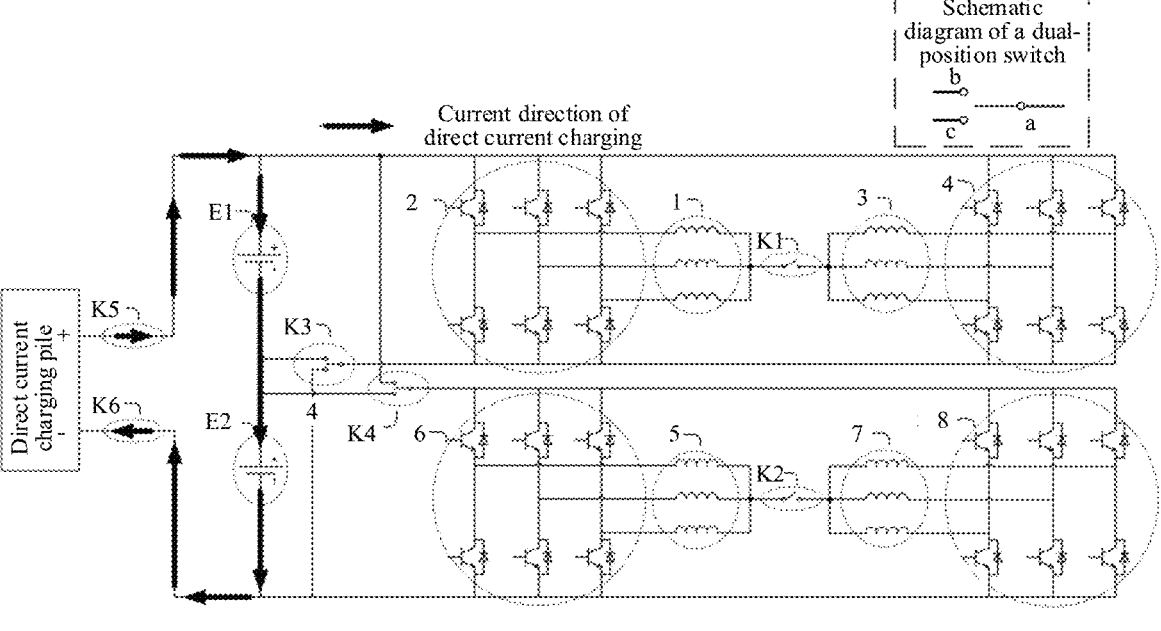
FIG. 10 is a schematic diagram of a current direction when a battery self-heating system operates according to another embodiment of the present disclosure.

For example, referring to FIG. 10, when the vehicle needs direct current charging, the first charging switch K5, the second charging switch K6, the first changeover switch K1, and the second changeover switch K2 are controlled to be turned off or turned on, the fixed contact a of the third changeover switch K3 is controlled to be not connected to the first moving contact b and the second moving contact c of the third changeover switch K3, and the fixed contact a of the fourth changeover switch K4 is controlled to be not connected to the first moving contact b and the second moving contact c of the fourth changeover switch K4.

It is noticeable that some drive motor controllers and drive motors in a multi-motor vehicle are used as heating modules to perform self-heating on the power battery pack. In other words, the drive motor controller and the drive motor may be configured to drive the vehicle, and may also be configured to perform self-heating on the power battery pack, without adding another element or heating apparatus, thereby meeting a requirement of heating the power battery pack and reducing costs. However, for another single-motor vehicle or dual-motor vehicle, a self-heating function of the power battery pack may be implemented by adding a switch and a winding as heating modules. For the multi-motor vehicle, a switch and a winding may also be added as the heating modules. This is not limited in the present disclosure.

For example, the switch may be formed by a single-phase bridge arm or a multi-phase bridge arm, or may be formed by another switch element having a function of turning on and turning off a circuit. The winding may be a separate single-phase winding or a multiphase winding, or may be a winding in a single-phase motor or a multiphase motor. This is not limited in the present disclosure. In addition, multiple heating modules may be connected to a same battery pack, and each heating module has a same bridge arm status and current direction in a same preset state. In addition, for a heating module that does not participate in driving the vehicle, a six-phase bridge arm and a six-phase motor may be used to replace the two three-phase bridge arms and the two three-phase motors shown in FIG. 5.

It is to be noted that the controller may be a control unit in the drive motor controller or an electronic device mounted in the vehicle. This is not limited in the present disclosure. A temperature sensor may also be arranged near the power battery pack, to transmit a collected battery temperature to the controller in real time. When the battery temperature is lower than a preset threshold, the controller automatically controls the power battery pack to perform self-heating. A heating button may also be set on the vehicle. For example, a vehicle-mounted display screen reminds a driver that the power battery pack is in a low-temperature state. Through the heating button set on the vehicle-mounted display screen, the driver may send a signal of starting self-heating to the controller. After receiving the signal, the controller controls the power battery pack to perform self-heating. This is not limited in the present disclosure.

In addition, in a process of controlling the battery pack to be alternately charged and discharged, one or more of the multiple bridge arms or switches may be controlled to be turned on, thereby controlling a number of windings involved in self-heating. For example, in FIG. 6, one of the three upper bridge arms of the first drive motor controller 2 may be selected to be turned on, so that the first battery pack E1 is discharged to charge a winding connected to the first battery pack in the first drive motor 1. Generally, the greater the number of windings involved in self-heating, the higher the efficiency of self-heating. In other possible implementations, the number of windings involved in self-heating may be controlled according to the battery temperature. For example, the lower the battery temperature, the greater the number of windings. This is not limited in the present disclosure.

Based on the same inventive concept, embodiments of the present disclosure further provide a vehicle, including the foregoing battery self-heating system. Through the battery self-heating system, a battery in the vehicle is heated and a temperature is increased, to ensure performance of the battery in a low-temperature environment. In addition, when direct current charging is performed on the vehicle, self-heating can also be performed on a power battery pack.

The preferred implementations of the present disclosure are described in detail above with reference to the accompanying drawings. However, the present disclosure is not limited to the details in the foregoing implementations, multiple simple deformations may be made to the technical solution of the present disclosure within a range of the technical concept of the present disclosure, and these simple deformations fall within the protection scope of the present disclosure.

In addition, it is to be noted that, the technical features described in the above implementations may be combined in any suitable manner without contradiction. To avoid unnecessary repetition, various possible combinations are not further described in the present disclosure.

In addition, different implementations of the present disclosure may also be arbitrarily combined without departing from the idea of the present disclosure, and these combinations shall still be regarded as content disclosed in the present disclosure.

What is claimed is:

1. A battery self-heating system, applicable to a vehicle, the system comprising:

a power battery pack comprising a first battery pack and a second battery pack connected to each other;

a first heating device comprising a first heating sub-device and a second heating sub-device, a first connection end and a second connection end of the first heating sub-device respectively connected to a positive electrode and a negative electrode of the first battery pack, a first connection end and a second connection end of the second heating sub-device respectively connected to the positive electrode and the negative electrode of the first battery pack, and a third connection end of the first heating sub-device connected to a third connection end of the second heating sub-device;

a second heating device comprising a third heating sub-device and a fourth heating sub-device, a first connection end and a second connection end of the third heating sub-device respectively connected to a positive electrode and a negative electrode of the second battery pack, a first connection end and a second connection end of the fourth heating sub-device respectively connected to the positive electrode and the negative electrode of the second battery pack, and a third connection end of the third heating sub-device connected to a third connection end of the fourth heating sub-device; and a controller, connected to the first heating device and the second heating device, and configured to: control the first heating device and the first battery pack to be alternately charged and discharged, control the second heating device and the second battery pack to be alternately charged and discharged, and control a first one of the first battery pack and the second battery pack to be in a charging state when a second one of the first battery pack and the second battery pack is in a discharging state.

2. The system according to claim 1, wherein:

the first heating sub-device comprises a first heating winding and a first switch, the second heating sub-device comprises a second heating winding and a second switch, the first switch comprises a first upper switch and a first lower switch connected to each other, and the second switch comprises a second upper switch and a second lower switch connected to each other, wherein the first upper switch is connected to the positive electrode of the first battery pack, the first lower switch is connected to the negative electrode of the first battery pack, a first end of the first heating winding is connected to a connection point between the first upper switch and the first lower switch, a second end of the first heating winding is connected to a first end of the second heating winding, a second end of the second heating winding is connected to a connection point between the second upper switch and the second lower switch, the second upper switch is connected to the positive electrode of the first battery pack, and the second lower switch is connected to the negative electrode of the first battery pack; and the third heating sub-device comprises a third heating winding and a third switch, the fourth heating sub-device comprises a fourth heating winding and a fourth switch, the third switch comprises a third upper switch and a third lower switch connected to each other, and the fourth switch comprises a fourth upper switch and a fourth lower switch connected to each other, wherein the third upper switch is connected to the positive electrode of the second battery pack, the third lower switch is connected to the negative electrode of the second battery pack, a first end of the third heating winding is connected to a connection point between the third upper switch and the third lower switch, a second end of the third heating winding is connected to a first end of the fourth heating winding, a second end of the fourth heating winding is connected to a connection point between the fourth upper switch and the fourth lower switch, the fourth upper switch is connected to the positive electrode of the second battery pack, and the fourth lower switch is connected to the negative electrode of the second battery pack.

3. The system according to claim 2, wherein:

the first heating winding is configured as a multiphase winding in a first drive motor of the vehicle, the first switch is a first multiphase inverter in a first drive motor controller corresponding to the first drive motor, the first upper switch represents an upper bridge arm of the first multiphase inverter, and the first lower switch represents a lower bridge arm of the first multiphase inverter;

the second heating winding is configured as a multiphase winding in a second drive motor of the vehicle, the second switch is a second multiphase inverter in a second drive motor controller corresponding to the second drive motor, the second upper switch represents an upper bridge arm of the second multiphase inverter, and the second lower switch represents a lower bridge arm of the second multiphase inverter;

the third heating winding is configured as a multiphase winding in a third drive motor of the vehicle, the third switch is a third multiphase inverter in a third drive motor controller corresponding to the third drive motor, the third upper switch represents an upper bridge arm of the third multiphase inverter, and the third lower switch represents a lower bridge arm of the third multiphase inverter; and the fourth heating winding is configured as a multiphase winding in a fourth drive motor of the vehicle, the fourth switch is a fourth multiphase inverter in a fourth drive motor controller corresponding to the fourth drive motor, the fourth upper switch represents an upper bridge arm of the fourth multiphase inverter, and the fourth lower switch represents a lower bridge arm of the fourth multiphase inverter.

4. The system according to claim 3, wherein:

the controller is configured to: in a first state, control the upper bridge arm of the first multiphase inverter to be turned on and control the lower bridge arm of the second multiphase inverter to be turned on, to control the first battery pack to be discharged to charge the first heating winding and the second heating winding, and control the lower bridge arm of the third multiphase inverter to be turned on and control the upper bridge arm of the fourth multiphase inverter to be turned on, to control the first heating winding and the second heating winding to charge the second battery pack; and the controller is configured to: in a second state, control the lower bridge arm of the first multiphase inverter to be turned on and control the upper bridge arm of the second multiphase inverter to be turned on, to control the first heating winding and the second heating winding to charge the first battery pack, and control the upper bridge arm of the third multiphase inverter to be turned on and control the lower bridge arm of the fourth multiphase inverter to be turned on, to control the second battery pack to be discharged to charge the first heating winding and the second heating winding.

5. The system according to claim 4, wherein the controller is further configured to:

in a same state, control a first ratio of a value of a current flowing through the first battery pack to a value of a current flowing through the second battery pack to be equal to a second ratio of a resistance value of the second battery pack to a resistance value of the first battery pack.

6. The system according to claim 3, further comprising: a first changeover switch, a second changeover switch, a third changeover switch, and a fourth changeover switch, wherein:

the third changeover switch and the fourth changeover switch are dual-position switches;

the first changeover switch is disposed on a connection circuit of the first heating winding and the second heating winding;

the second changeover switch is disposed on a connection circuit of the third heating winding and the fourth heating winding;

a fixed contact of the third changeover switch is connected to a connection end between the lower bridge arm of the first multiphase inverter and the lower bridge arm of the second multiphase inverter, a first moving contact of the third changeover switch is connected to a negative electrode end of the first battery pack and a positive electrode end of the second battery pack, and a second moving contact of the third changeover switch is connected to a negative electrode end of the second battery pack;

a fixed contact of the fourth changeover switch is connected to a connection end between the upper bridge arm of the third multiphase inverter and the upper bridge arm of the fourth multiphase inverter, a first moving contact of the fourth changeover switch is connected to a positive electrode end of the first battery pack, and a second moving contact of the fourth changeover switch is connected to the negative electrode end of the first battery pack and the positive electrode end of the second battery pack; and the first changeover switch, the second changeover switch, the third changeover switch, and the fourth changeover switch are connected to the controller, and the controller is configured to: control the first changeover switch and the second changeover switch to be turned on, control the fixed contact of the third changeover switch to be connected to the first moving contact of the third changeover switch, and control the fixed contact of the fourth changeover switch to be connected to the second moving contact of the fourth changeover switch, to self-heat the first battery pack and the second battery pack.

7. The system according to claim 6, wherein the controller is further configured to: control the first changeover switch and the second changeover switch to be turned off, control the fixed contact of the third changeover switch to be connected to the second moving contact of the third changeover switch, and control the fixed contact of the fourth changeover switch to be connected to the first moving contact of the fourth changeover switch, to control the first battery pack and the second battery pack to supply power to the first drive motor, the second drive motor, the third drive motor, and the fourth drive motor to drive the vehicle.

8. The system according to claim 6, further comprising a first charging switch and a second charging switch; wherein:

the first charging switch is disposed on a connection circuit of a charging port of the vehicle and the positive electrode of the first battery pack;

the second charging switch is disposed on a connection circuit of the charging port of the vehicle and the negative electrode of the second battery pack; and the controller is further configured to: in response to that the vehicle is connected to a charging pile, control the first charging switch and the second charging switch to be turned on, to charge the power battery pack while self-heating the first battery pack and the second battery pack.

9. The system according to claim 8, wherein:

the controller is further configured to: in response to that the vehicle is connected to the charging pile, control the first charging switch and the second charging switch to be turned on, and control the third changeover switch and the fourth changeover switch to be turned off, to charge the power battery pack.

10. A vehicle, comprising a battery self-heating system, the system comprising:

a power battery pack comprising a first battery pack and a second battery pack connected to each other;

a first heating device comprising a first heating sub-device and a second heating sub-device, a first connection end and a second connection end of the first heating sub-device respectively connected to a positive electrode and a negative electrode of the first battery pack, a first connection end and a second connection end of the second heating sub-device respectively connected to the positive electrode and the negative electrode of the first battery pack, and a third connection end of the first heating sub-device connected to a third connection end of the second heating sub-device;

a second heating device comprising a third heating sub-device and a fourth heating sub-device, a first connection end and a second connection end of the third heating sub-device respectively connected to a positive electrode and a negative electrode of the second battery pack, a first connection end and a second connection end of the fourth heating sub-device respectively connected to the positive electrode and the negative electrode of the second battery pack, and a third connection end of the third heating sub-device connected to a third connection end of the fourth heating sub-device; and a controller, connected to the first heating device and the second heating device, and configured to: control the first heating device and the first battery pack to be alternately charged and discharged, control the second heating device and the second battery pack to be alternately charged and discharged, and control a first one of the first battery pack and the second battery pack to be in a charging state when a second one of the first battery pack and the second battery pack is in a discharging state.

11. The vehicle according to claim 10, wherein:

the first heating sub-device comprises a first heating winding and a first switch, the second heating sub-device comprises a second heating winding and a second switch, the first switch comprises a first upper switch and a first lower switch connected to each other, and the second switch comprises a second upper switch and a second lower switch connected to each other, wherein the first upper switch is connected to the positive electrode of the first battery pack, the first lower switch is connected to the negative electrode of the first battery pack, a first end of the first heating winding is connected to a connection point between the first upper switch and the first lower switch, a second end of the first heating winding is connected to a first end of the second heating winding, a second end of the second heating winding is connected to a connection point between the second upper switch and the second lower switch, the second upper switch is connected to the positive electrode of the first battery pack, and the second lower switch is connected to the negative electrode of the first battery pack; and the third heating sub-device comprises a third heating winding and a third switch, the fourth heating sub-device comprises a fourth heating winding and a fourth switch, the third switch comprises a third upper switch and a third lower switch connected to each other, and the fourth switch comprises a fourth upper switch and a fourth lower switch connected to each other, wherein the third upper switch is connected to the positive electrode of the second battery pack, the third lower switch is connected to the negative electrode of the second battery pack, a first end of the third heating winding is connected to a connection point between the third upper switch and the third lower switch, a second end of the third heating winding is connected to a first end of the fourth heating winding, a second end of the fourth heating winding is connected to a connection point between the fourth upper switch and the fourth lower switch, the fourth upper switch is connected to the positive electrode of the second battery pack, and the fourth lower switch is connected to the negative electrode of the second battery pack.

12. The vehicle according to claim 11, wherein:

the first heating winding is configured as a multiphase winding in a first drive motor of the vehicle, the first switch is a first multiphase inverter in a first drive motor controller corresponding to the first drive motor, the first upper switch represents an upper bridge arm of the first multiphase inverter, and the first lower switch represents a lower bridge arm of the first multiphase inverter;

the second heating winding is configured as a multiphase winding in a second drive motor of the vehicle, the second switch is a second multiphase inverter in a second drive motor controller corresponding to the second drive motor, the second upper switch represents an upper bridge arm of the second multiphase inverter, and the second lower switch represents a lower bridge arm of the second multiphase inverter;

the third heating winding is configured as a multiphase winding in a third drive motor of the vehicle, the third switch is a third multiphase inverter in a third drive motor controller corresponding to the third drive motor, the third upper switch represents an upper bridge arm of the third multiphase inverter, and the third lower switch represents a lower bridge arm of the third multiphase inverter; and the fourth heating winding is configured as a multiphase winding in a fourth drive motor of the vehicle, the fourth switch is a fourth multiphase inverter in a fourth drive motor controller corresponding to the fourth drive motor, the fourth upper switch represents an upper bridge arm of the fourth multiphase inverter, and the fourth lower switch represents a lower bridge arm of the fourth multiphase inverter.

13. The vehicle according to claim 12, wherein:

the controller is configured to: in a first state, control the upper bridge arm of the first multiphase inverter to be turned on and control the lower bridge arm of the second multiphase inverter to be turned on, to control the first battery pack to be discharged to charge the first heating winding and the second heating winding, and control the lower bridge arm of the third multiphase inverter to be turned on and control the upper bridge arm of the fourth multiphase inverter to be turned on, to control the first heating winding and the second heating winding to charge the second battery pack; and the controller is configured to: in a second state, control the lower bridge arm of the first multiphase inverter to be turned on and control the upper bridge arm of the second multiphase inverter to be turned on, to control the first heating winding and the second heating winding to charge the first battery pack, and control the upper bridge arm of the third multiphase inverter to be turned on and control the lower bridge arm of the fourth multiphase inverter to be turned on, to control the second battery pack to be discharged to charge the first heating winding and the second heating winding.

14. The vehicle according to claim 13, wherein the controller is further configured to:

in a same state, control a first ratio of a value of a current flowing through the first battery pack to a value of a current flowing through the second battery pack to be equal to a second ratio of a resistance value of the second battery pack to a resistance value of the first battery pack.

15. The vehicle according to claim 12, wherein the system further comprises: a first changeover switch, a second changeover switch, a third changeover switch, and a fourth changeover switch, wherein:

the third changeover switch and the fourth changeover switch are dual-position switches;

the first changeover switch is disposed on a connection circuit of the first heating winding and the second heating winding;

the second changeover switch is disposed on a connection circuit of the third heating winding and the fourth heating winding;

a fixed contact of the third changeover switch is connected to a connection end between the lower bridge arm of the first multiphase inverter and the lower bridge arm of the second multiphase inverter, a first moving contact of the third changeover switch is connected to a negative electrode end of the first battery pack and a positive electrode end of the second battery pack, and a second moving contact of the third changeover switch is connected to a negative electrode end of the second battery pack;

a fixed contact of the fourth changeover switch is connected to a connection end between the upper bridge arm of the third multiphase inverter and the upper bridge arm of the fourth multiphase inverter, a first moving contact of the fourth changeover switch is connected to a positive electrode end of the first battery pack, and a second moving contact of the fourth changeover switch is connected to the negative electrode end of the first battery pack and the positive electrode end of the second battery pack; and the first changeover switch, the second changeover switch, the third changeover switch, and the fourth changeover switch are connected to the controller, and the controller is configured to: control the first changeover switch and the second changeover switch to be turned on, control the fixed contact of the third changeover switch to be connected to the first moving contact of the third changeover switch, and control the fixed contact of the fourth changeover switch to be connected to the second moving contact of the fourth changeover switch, to self-heat the first battery pack and the second battery pack.

16. The vehicle according to claim 15, wherein the controller is further configured to: control the first changeover switch and the second changeover switch to be turned off, control the fixed contact of the third changeover switch to be connected to the second moving contact of the third changeover switch, and control the fixed contact of the fourth changeover switch to be connected to the first moving contact of the fourth changeover switch, to control the first battery pack and the second battery pack to supply power to the first drive motor, the second drive motor, the third drive motor, and the fourth drive motor to drive the vehicle.

17. The vehicle according to claim 15, wherein the system further comprises a first charging switch and a second charging switch; and wherein:

the first charging switch is disposed on a connection circuit of a charging port of the vehicle and the positive electrode of the first battery pack;

the second charging switch is disposed on a connection circuit of the charging port of the vehicle and the negative electrode of the second battery pack; and the controller is further configured to: in response to that the vehicle is connected to a charging pile, control the first charging switch and the second charging switch to be turned on, to charge the power battery pack while self-heating the first battery pack and the second battery pack.

18. The vehicle according to claim 17, wherein:

the controller is further configured to: in response to that the vehicle is connected to the charging pile, control the first charging switch and the second charging switch to be turned on, and control the third changeover switch and the fourth changeover switch to be turned off, to charge the power battery pack.

* * * * *